United States Patent [19]
Jevaney et al.

[11] Patent Number: 5,984,601
[45] Date of Patent: Nov. 16, 1999

[54] REPOSITIONABLE BULKHEAD PANEL

[75] Inventors: Fred Jevaney, Elmhurst; Stanley Kacki, DesPlaines, both of Ill.

[73] Assignee: Randall Industries, Inc., Elmhurst, Ill.

[21] Appl. No.: 08/957,455

[22] Filed: Oct. 24, 1997

Related U.S. Application Data

[60] Provisional application No. 60/029,028, Oct. 25, 1996.

[51] Int. Cl.$^6$ ...................................................... B60P 7/14
[52] U.S. Cl. ........................................... 410/129; 410/121
[58] Field of Search ...................................... 410/121, 129; 220/529, 532; 52/64, 309.4, 406.1, 457, 588.1; 296/24.1, 901, 191; 160/371, 40; 62/447

[56] References Cited

U.S. PATENT DOCUMENTS

| | | | |
|---|---|---|---|
| 1,704,758 | 3/1929 | Meinhardt | 296/24.1 X |
| 1,896,198 | 2/1933 | MacMillan | 410/129 |
| 2,559,304 | 7/1951 | Lundvall | 410/129 |
| 3,680,492 | 8/1972 | Weage | 410/129 |
| 5,010,943 | 4/1991 | Boyer | 296/24.1 X |
| 5,161,848 | 11/1992 | Lutton | 296/24.1 |
| 5,664,386 | 9/1997 | Palmersten | 52/588.1 |
| 5,704,676 | 1/1998 | Hill | 296/24.1 |

FOREIGN PATENT DOCUMENTS

19658  of 1902  United Kingdom ................... 220/529

*Primary Examiner*—Stephen T. Gordon
*Attorney, Agent, or Firm*—Jerry A. Schulman

[57] ABSTRACT

A repositionable insulating truck bulkhead panel has lower and lateral reinforcing rails made form impact-resistant material to reinforce and support a pair of thermoplastic panel face panels between which closed cell foam is inserted to add insulating properties and structural strength. Molded-in channels on the front and rear of the panels provide multiple, selectable recessed mounting sites for hardware such as handles and cleats and also provides paths for air circulation.

32 Claims, 6 Drawing Sheets

REPOSITIONABLE BULKHEAD PANEL

FIELD OF THE INVENTION

The present invention relates generally to insulating and separating bulkhead constructions and, more particularly, to a bulkhead panel construction consisting of interengageable bulkhead units useful for dividing a large storage space into smaller, individual storage compartments physically and thermally separated from one another and claims priority based upon provisional application Ser. No. 60/029,028 filed Oct. 25, 1996.

BACKGROUND OF THE INVENTION

A well-known technique for transporting perishable goods by truck trailer is to use moveable bulkhead units to divide the trailer into separate storage compartments and to maintain each compartment at a temperature necessary to preserve the goods during transport. As an example, truckers are frequently required to carry frozen goods, refrigerated goods and non-refrigerated, or "dry" goods on a single trailer for delivery to a number of different stops. Compartments must then be configured to provide storage spaces maintained at sub-freezing, cooling and ambient temperatures, and must be arranged to allow the trucker access to the compartments to off-load ordered goods at each stop. Preferably, the bulkhead units are repositionable to allow the trucker to adjust the sizes of the individual compartments to meet the load volume and variety for each day's deliveries. Size adjustment is important in maintaining cooling efficiency and economy: a compartment that is only partially filled requires the refrigeration unit to work much harder to keep the stored goods at the right temperature.

Keeping loads at "safe" temperatures sometimes means protecting the loads from ambient temperatures as well as allowing temperature-controlled air to refrigerate the compartments. For example, during winter months, dry goods may need to be protected from freezing and one way to provide such protection is to use thermally-insulated and repositionable bulkhead units to construct a temporary compartment around such goods until they have been safely delivered. It may also be necessary at times to erect temporary insulating shelters for goods that must be protected until used as, for example, frozen meats intended to be handled and served at a fair, festival and the like. Lightweight repositionable insulating bulkhead units make it possible to turn otherwise unrefrigerated interior space into temporarily insulated storage space.

A preferred use for repositionable insulating bulkhead unit is in refrigerated truck trailers, and it is this use that will form much of the disclosure of the present invention. One such bulkhead is described in U.S. Pat. No. 5,010,943 (Boyer) as having a frame within which panels of polystyrene insulation are positioned, a number of reinforcing ribs placed in between adjacent polystyrene panels, a flexible insulating material covers the polystyrene panels and the frame members, a layer of acrylonitrile-butadiene-styrene ("ABS") and resilient seals which extend along the top and down both sides of the frame. The panel is sized to extend across the entire width of a truck trailer and the seals are designed to allow the Boyer panel to be "wedged" against the sidewalls of the trailer to hold them in place.

Boyer also describes a variation of the panel in which first and second panels are used, each equal in size to about one-half the trailer width. The panels interengage along one edge to form an equivalent of the large panel. No provision is made to combine Boyer's panels into other configurations.

Use of bulkheads to divide a refrigerated truck trailer into separate, temperature-maintained zones is described in U.S. Pat. No. 5,161,848 (Lutton), assigned to Kidron, Inc. Lutton describes the advantages of dividing a truck trailer lengthwise using a continuous bulkhead held in floor and ceiling channels formed down the center of the trailer and the use of transverse bulkhead sections to divide the trailer further into frozen, refrigerated and dry zones. One of the advantages claimed by Lutton is ease of access to the individual compartments from the rear door of the trailer, obviating the need for a side door to load and unload.

Lutton describes repositionable bulkhead or partition units used to change the interior trailer configuration having an inner core of conventional insulating material sandwiched between two sheets of lightweight, flexible materia such as fiberglass. Each panel is closed off at its ends by "sealing structures" described as rigid, aluminum tongues sized to be inserted into a channel formed by a U-shaped fiberglass member. The seal formed by the panels is dependent upon the force with which the tongue is forced into and held within the channel. Lutton teaches the use of a foam rubber channel insert as a contact material for the tongue. As seen in FIG. 8 of Lutton, the sealing contact between adjacent panels appears to be confined to the area at which the tongue (110) touches the foam rubber insert (116), while the strength of the panels appears to be limited by the selection of materials used for the panels and the channels.

Lutton also teaches the use of transverse bulkhead panels with edges formed from foam rubber covered by flexible fabric. The bulkhead panels are sized to form a friction fit between the ceiling and floor of the trailer, and between the sidewall of the trailer and the panels used to form the center partition, and the flexible seals are intended to hold the bulkhead panel in place frictionally. Straps are also used to attach the bulkhead panels to special connectors attached to the center panels and to tracks specially installed along the trailer sidewall.

Sites are commonly provided on the faces of such panels for mounting hardware such as handles and tie-down cleats and typically the locations for these sites will be determined prior to molding or forming the panel faces and will be selected to place the handles or tie-downs back-to-back on opposite sides of the panel in order to allow the handles/cleats to be secured by bolts passing through a handle or cleat on one side of the panel, through the panel itself and through the handle or cleat located on the opposite side of the panel. Such sites are desirably recessed so that the handle or cleat does not protrude and interfere with the stacking of cargo. This system works well for initial construction but causes problems when a handle or cleat must be moved to a different location because of configuration problems or damage to the panel.

Accordingly, the need exists for improved durable, lightweight interengageable insulating panels adapted to be assembled within an enclosed space to divide the space into different temperature zones.

Further, the need exists for such panels to be constructed with oversized bottom rails to protect the lowermost portions of the panels and the fasteners used to assemble the rails to the panels.

The need further exists for such panels to allow the flow of air past cartons or other containers that may be stacked up against the panels.

Finally, a need also exists for such panels to provide recesses allowing the selective positioning of handles and cleats on the panels.

3

The present invention resides in a unique panel unit construction particularly useful for assembly into a center dividing wall down the length of a truck trailer with each panel including reinforcing bottom and side rails made from particularly durable materials and configured to protect the fasteners used to assemble the panels. A series of reinforcing and ventilating channels are formed on the panel faces to stiffen the panels, provide air circulation past goods stacked up against the panels and to provide selectable mounting sites for handles and cleats. Each panel unit is assembled from a pair of spaced-apart face panels glued or otherwise fastened together about their peripheries and between which is injected a closed-cell foam to provide support and insulation. Side rails are mounted to each panel unit with mating male and female connectors to enable the panels to be laterally interengaged. A centrally-positioned track located on the lowermost part of the bottom rail is inserted into a groove formed in the truck floor and a compression seal mounted to the top edge of the panel is compressed against the truck roof to hold the panel in place.

BRIEF DESCRIPTION OF THE DRAWINGS

These and further aspects of the present invention will become more apparent by referring to the accompanying drawings, herein.

DETAILED DESCRIPTION OF THE DRAWINGS

Figures 1, 3:
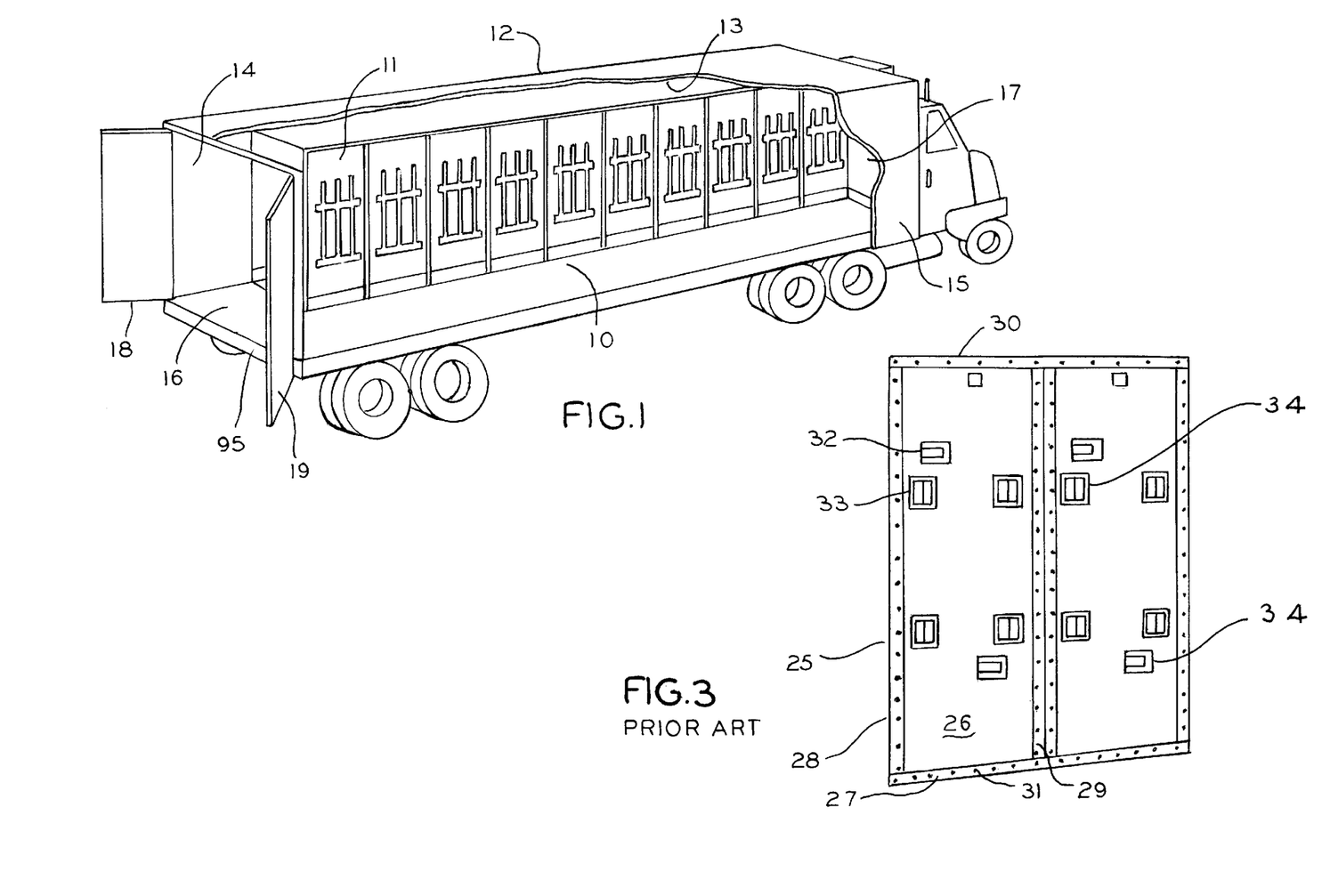
FIG. 1 is a partially cut away perspective view of a truck trailer having a longitudinally-extending center partition assembled from individual repositionable panels in accordance with the present invention.
FIG. 3 is a perspective view of a prior art panel assembly.

Referring now to FIG. 1, the numeral 10 indicated generally a center divider assembled from individual panels 11 and adapted for installation in a truck trailer 12. Typically, trailer 12 has a ceiling 13, left and right walls 14, 15, a floor 16, a front bulkhead 17 and a pair of rear doors 18, 19 which define a storage space in the form of a parallelpiped. As shown, divider 10 is preferably used to divide the interior of trailer 12 longitudinally down its center to form a pair of storage spaces of approximately equal volume and extending from front bulkhead 17 to proximate rear doors 18, 19. Other panel configurations are also possible as explained below.

Use of separate, interengageable panels makes it possible to construct dividers in trailers of varying lengths, to replace damaged panels and to conveniently disassemble and store the individual panels within the trailer when the center divider is no longer needed.

Figure 2:
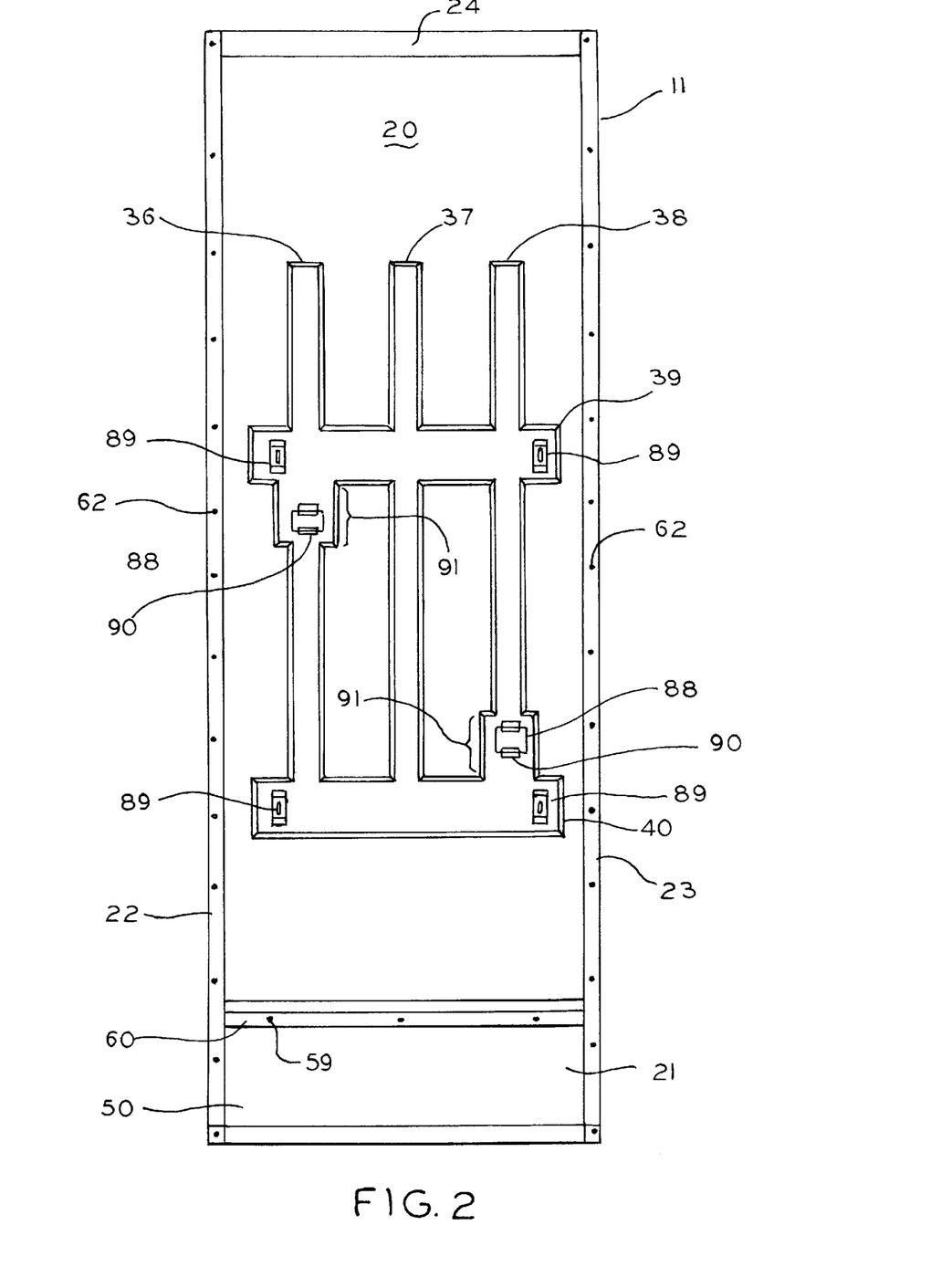
FIG. 2 is a front elevational view of an individual panel of FIG. 1.

Referring now to FIG. 2, there is shown a front elevation of individual panel 11 having a front panel face 20 framed in by a bottom rail 21, a left side rail 22, a right side rail 23 and a top, compressible bumper 24. As will be discussed in more detail below, each panel 11 actually consists of a pair of panel faces such as 20 attached together to form a cavity therebetween which is thereafter filled with a closed-cell insulating foam.

Referring now to FIG. 3, a panel 25 representative of prior art panels is shown having, as general features of construction, a panel front 26 framed in by a bottom rail 27, side rails 28 and 29 and a top bumper 30. Because bottom rail 27 was customarily manufactured as an extrusion from materials such as high density polypropylene, it was necessarily relatively thin due to considerations of stiffness and strength. This meant that fasteners 31, most typically, rivets made from aluminum, were positioned near floor 16, meaning they were subject to being bumped, kicked and broken when cargo was on- or off-loaded, requiring frequent maintenance and repair to keep panels such as 25 in usable condition. Another common characteristic of such panels is the mounting thereon of handles and cleats, such as those shown at 32 and 33, respectively. In order to provide flat wall surfaces for the stacking of cargo, handles 32 and cleats 33 are mounted in recesses on panel face 26. Panel faces 26 are customarily molded as individual panels and assembled in pairs back-to-back to form panel 25, and the sites for recesses such as 34 are selected as part of the original manufacturing process, meaning that once selected, the sites cannot be moved and the handle 32 or cleat 33 can only be installed at that side. Because cleats 33 are used to anchor movable bulkhead panels intended to be mounted between divider 10 and either tuck wall 14 or 15, the repositioning of a cleat to make attachment easier would sometimes be desirable. Damage to a handle or cleat and, at the same time, to the panel at the attachment site may make reattachment impossible to effect and may require replacement of the panel.

In the present invention, provisions have been made to more fully protect the fasteners used to attach bottom rail 21 and to make it more convenient to relocate handles 32 or cleats 33 as needed.

In order to more fully understand the advantages of the present invention, a detailed discussion of the construction of a typical panel 11 should be had. Each panel 11 is formed from a pair of thermoplastic, semi-rigid skins molded into a three-dimensional pattern. As seen in FIGS. 6–9, a front skin 35 is molded as a three-dimensional structure from a thermoplastic material, preferably a material such as ABS, IIDPE or polypropylene, in a thickness from about 0.100 in. to about 0.135 in. In a preferred embodiment, a series of vertically-extending channels 36, 37 and 38 are molded into skin 35, while a series of horizontally-extending channels 39, 40 are similarly molded in and intersect channels 36–38 as shown. Apart from fulfilling the purposes discussed below, channels 36–40 act as ribs to stiffen the relatively thin skin 35 and add a certain amount of structural strength.

Figure 7:
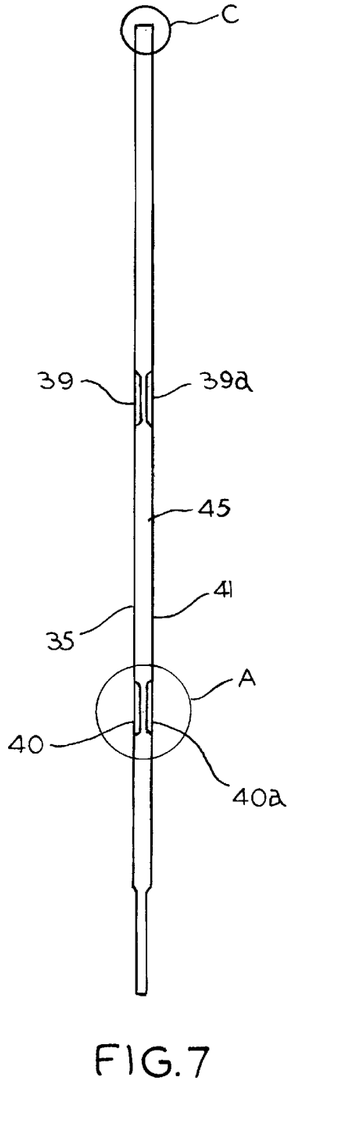
FIG. 7 is a view along 7—7 of FIG. 6 showing the assembly of a pair of panel skins and the handle and cleat channels formed thereon.
Figure 8:
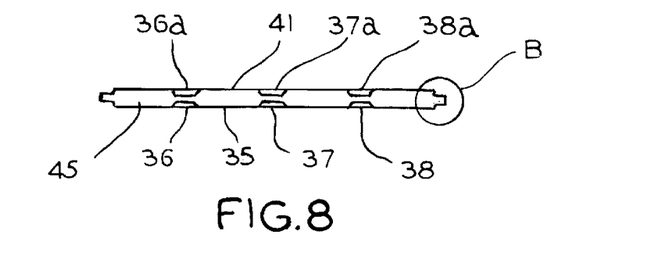
FIG. 8 is a view along 8—8 of FIG. 6 showing the vertical channels.
Figure 9:
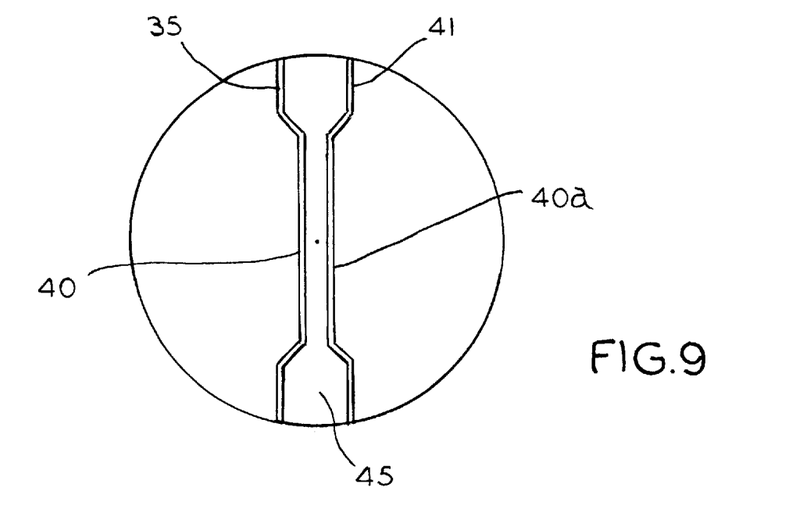
FIG. 9 is an enlargement of detail A of FIG. 7.

As seen in FIGS. 7–9, each front skin 35 is attached to a corresponding rear skin 41, and a pattern of channels is molded into each rear skin 41 which is a mirror image of the pattern defined by channels 36–40. Corresponding portions of the channels formed on first and rear skins 35 and 41 are aligned with one another as, for example, shown in FIG. 9 where front horizontal channel 40 is aligned and coextensive with rear horizontal channel 40*a*. In like fashion, as shown in FIG. 8, vertical channels 36, 37 and 38 are aligned and coextensive with rear vertical channels 36*a*, 37*a* and 38*a*.

Figure 10:
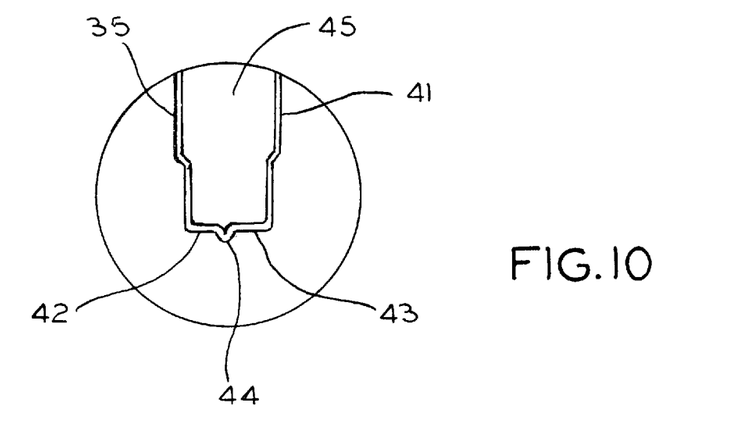
FIG. 10 is an enlargement of detail B of FIG. 8.
Figure 11:
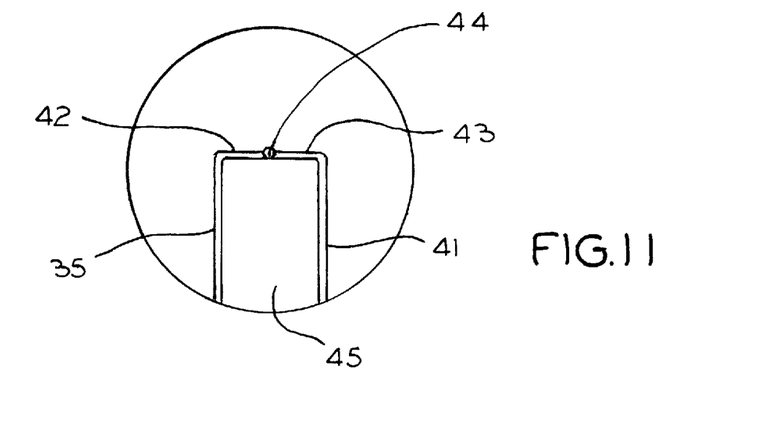
FIG. 11 is an enlargement of detail C of FIG. 7.

As shown in detail in FIGS. 10 and 11, front and rear skins 35 and 41 are formed with peripherally-extending depending skirts 42 and 43 and when skins 35 and 41 are placed to overlie one another, skirts 42 and 43 meet at bead 44. Skins 35 and 41 are fastened together about their periphery at bead 44 by head welding, solvent cement, mechanical fasteners or other fastening expedient consistent with the material from which said skins are made, thus forming an air space 45 defined by the inner surfaces of skins 35 and 41. A closed-cell insulating foam is then injected into air space 45 via ports 46 until said air space is completely filled. One such foam material preferably used is polyurethane closed-cell foam.

Figure 4:
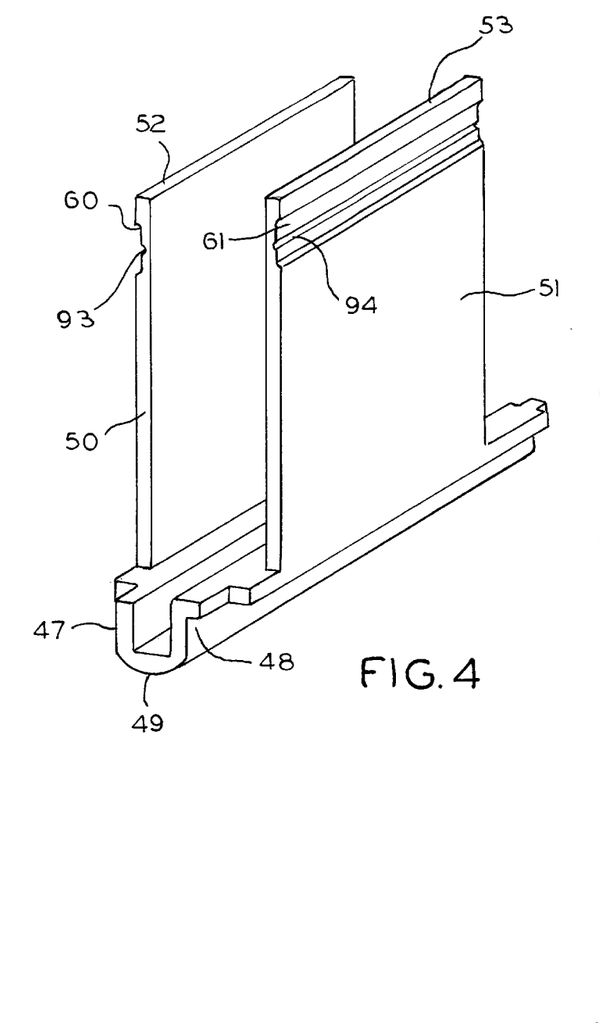
FIG. 4 is a partial perspective view of a bottom rail from one of the panels of FIG. 1.
Figure 5:
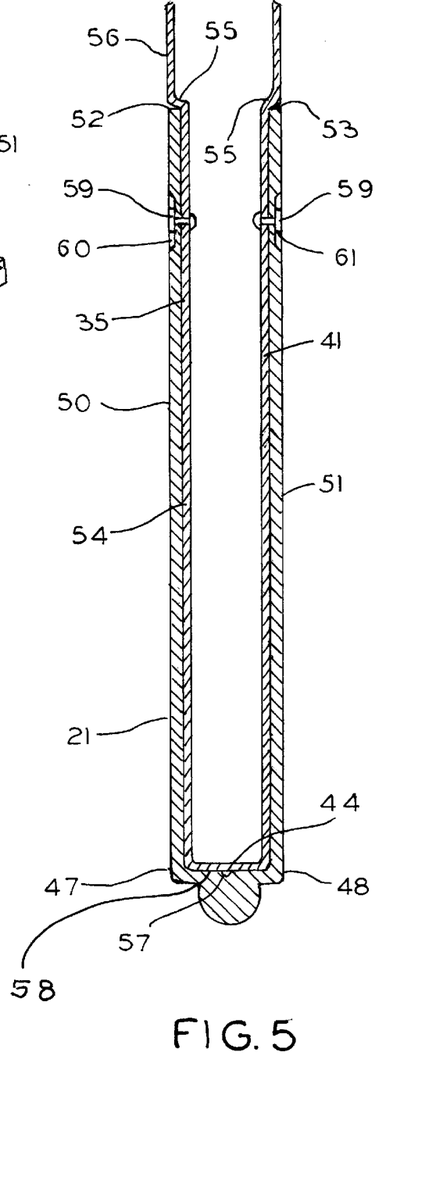
FIG. 5 is a lateral sectional view of the bottom rail of FIG. 4 assembled to a panel.
Figure 6:
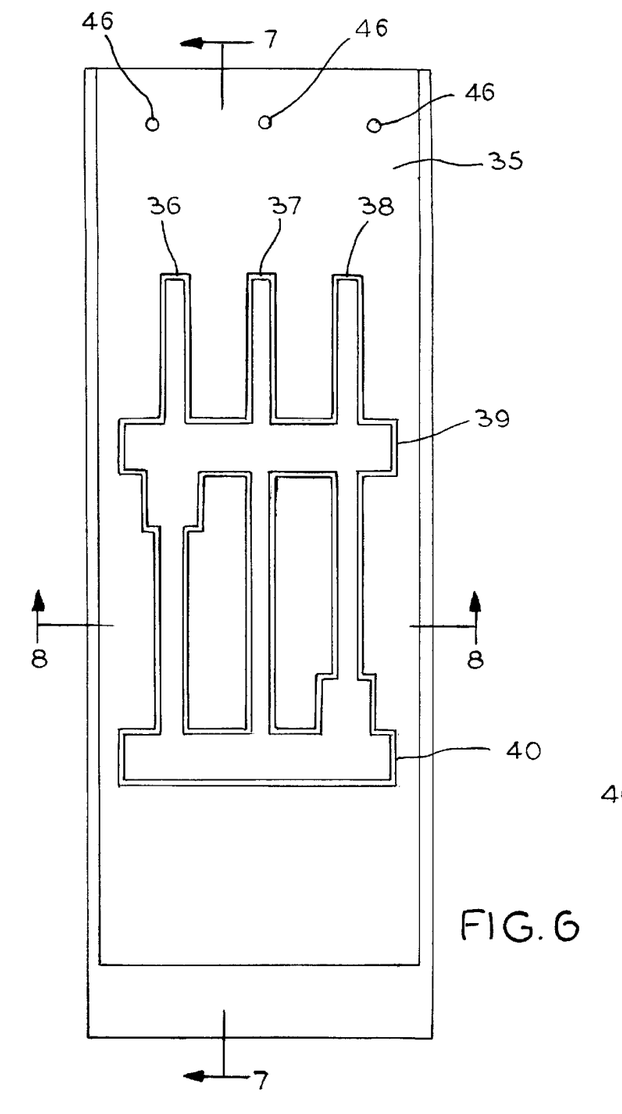
FIG. 6 is a front elevation of the skin assembly of FIG. 2.

Referring now to FIGS. 4 and 5, bottom rail 21 is shown having a lower channel 47 with a base 48 with which track 49 is integrally formed and from which said track protrudes in a downward direction. Integral with and extending upward from base 48 are front rail wall 50 and rear rail wall 51 which are arranged parallel and coextensive one to the other and which terminate at edges 52 and 53, respectively. As best seen in FIG. 5, front and rear rail walls 50 and 51 are spaced apart to receive the lowermost wall portion 54 of panel 11. In a preferred embodiment, wall portion 54 is formed with an offset or taper along sufficient of its length to allow panel 11 to "nest" within bottom rail 21 with a "break" 55 sized and configured to allow the uppermost portion 56 of panel 11 to be substantially coextensive with rail walls 50 and 51. In yet another preferred embodiment, a groove 57 is formed along the upper surface 58 of base 48 to accommodate and engage that portion of bead 44 extending along the bottom of panel 11.

Bottom rail 21 is preferably manufactured as an extrusion which is cut off at lengths substantially equal to the width of each panel 11 and ideally should be made from a material that is tough, resilient and able to withstand impacts from carts, dollies, fork lifts, hand trucks and other equipment commonly used to load and unload truck trailers. In a preferred embodiment of the present invention, bottom rail 21 is extruded from a material known as UHMW-PE (also known by the tradename of Tyvar 1000), sold by Laird Plastics of West Palm Beach, Fla. UHMW-PE has been shown to have superior impact-resistance characteristics than polycarbonate and impact-resistant nylon. As reported by Laird in its 1994 Product Catalog at page 235, UHMW-PE achieved a rating of "no break" in the "Notched Izod (73° F.) Test". The use of such a material makes it possible to make lower rail walls 50 and 51 extend upward to a greater length than if a less durable material were used. In a preferred embodiment, walls 50 and 51 extend upward to a distance of about 12 to 24 in. from base 48. The greater impact resistance of UHMW-PE combined with its relatively "slick" surface properties makes it well-suited for use in freezer trucks where moisture can condense and freeze on bulkhead panels where ice build-up must sometimes be chipped or knocked from panels.

Referring again to FIGS. 2 and 5, it can be seen that lower rial 21 is secured to panel 11 by a series of fasteners 59, most commonly rivets, which are passed through lower rail front wall 50 and front skin 35, and lower rail rear wall 51 and rear skin 41. A rivet channel 60 is formed on front wall 50, extending parallel to base 48 and preferably proximate edge 52, while a similarly sized, shaped and positioned channel 61 is formed on rear wall 51. The depth of channels 60, 61 is sufficient to fully countersink the exposed heads of rivets 59 so that the rivets do not extend pas walls 50 and 51. The selection of UHMW-PE, positioning rivets 59 well above the bottom of bottom rail 21 and providing countersinking channels 60 and 61 to protect said rivets increase the durability and reliability of panel 11 to a degree not heretofore known in the art.

Figure 12:
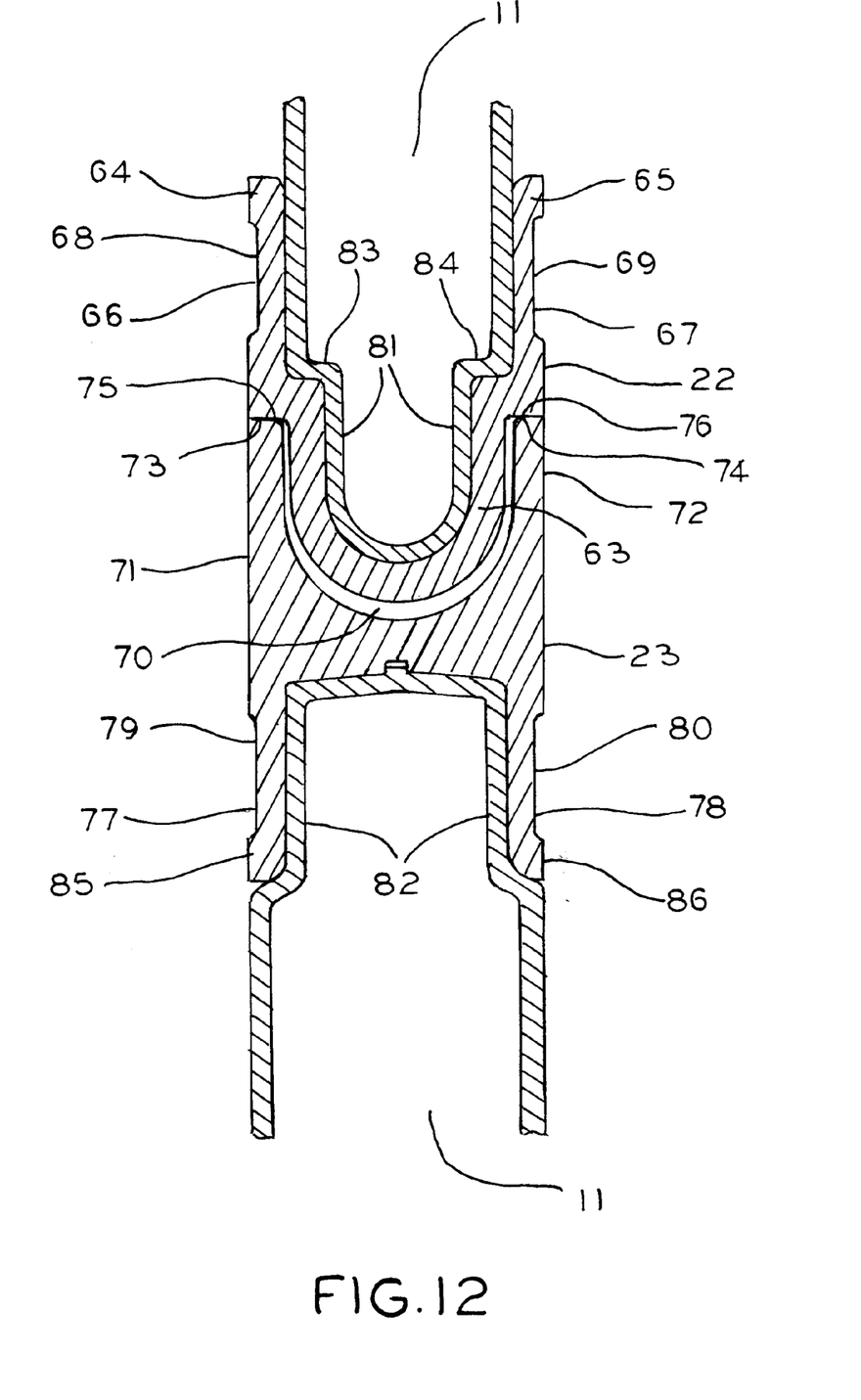
FIG. 12 is a partial sectional view showing the interengagement of male and female side rails attached to the panel of FIG. 2.

Referring now to FIG. 2, it can be seen that side rails 22 and 23 extend along opposed lateral sides of panel 11, preferably along the entire height of said panel, and are fastened to front and rear skins 35, 41 by a series of fasteners (typically, aluminum rivets) 62 fastened at intervals along the length of each such rail. As seen in FIG. 12, rials 22 and 23 are made in male and female configurations to enable edge-to-edge interengagement of panels 11. Side rail 22 is formed in a male configuration having a generally U-shaped base 63 from which a pair of flanges 64, 65 extend in spaced-apart, parallel configuration. As with bottom rail 21, side rail 22 has a pair of rivet channels 66, 67 extending, respectively, along flanges 64 and 65, within which rivets 62 are recessed when mounted to protect the rivet heads from impact and possible damage. For ease of alignment and installation, a channel groove 68 is formed along channel 66 and a channel groove 69 is formed along channel 67 to act as a guide for drilling the holes necessary to mount rivets 62.

Also shown in FIG. 12 is female side rail 23 preferably formed with a generally U-shaped, longitudinally-extending channel 70 sized and shaped to allow base 63 to be inserted therein along its length to enable adjacent of panels 11 to be vertically aligned in edge-to-edge arrangement. Channel 70 has upstanding channel walls 71, 72 terminating, respectively, at lips 73, 74. In a preferred embodiment of side rail 22, shoulders 75, 76 are formed on the exterior surface thereof against which lips 73, 74 may abut when adjacent panels 11 are interengaged. For ease of disengagement, side rails 22 and 23 have a clearance one from the other of about 1/16 inch.

In a preferred construction, the outermost lateral portions of panel 11 have tapered wall sections 81, 82 formed thereon to allow panel 11 to "nest" within side rail base flanges 64 and 65 with offsets 83, 84 sized to allow panel 11 and side rail 22 to form a generally flush, planar surface. To provide a similar nesting capability, side rail 23 has a pair of flanges 85, 86 integral and coextensive with channel walls 71 and 72 to nest with tapered sections 82.

As with rail 22, rail 23 has a pair of rivet channels 77, 78 formed thereon on the exterior surfaces of flanges 85, 86 respectively, with rivet channel grooves 79, 80 formed therein to allow for accurate location of rivets during assembly.

Preferably, rails 22 and 23 are manufactured as extrusions formed from UHMW-PE, and are cut to the lengths necessary to fully cover and protect the lateral edges of panel 11.

Referring now to FIG. 2, it can be seen that, as heretofore mentioned, panel 11 has a pattern formed form vertical channels 36, 37 and 38 and horizontal channels 39 and 40, with said channels molded into and recessed from front skin 35. It is intended that said channels will provide mounting sites for hardware such as handles 88 and cleats 89 and will be of sufficient depth to place such hardware at or beneath the surface of front skin 35 when mounted. Typically, such channels will be molded to a depth of about one-half in. and will not only serve as mounting sites but as stiffening ribs as well for the relatively thin skin 35. Vertical channels 36, 37 and 38 are typically about 3 in. wide while horizontal channels 39, 40 are about 6 in. wide.

Handles 88 typically have a grip 90 spring-biased normally to sit flush within a recessed mounting site such as formed by channels 36–40. Cleats 89 are most commonly mounted with the longest dimension vertically and may be made singly or in strips of multiple cleats. Channels 39 and 40 are dimensioned to allow the attachment of handles 88 or cleats 89 at any point along their respective lengths. Preferably, channel 36 has an enlarged segment 91 intersecting with channel 39, and channel 38 has an enlarged segment 92 intersecting with channel 40, both of sufficient width to allow placement of handles 88 or cleats 89 along a vertically-extending range as well, a range preferably or about 6 in. although it should be understood that the dimensions and arrangements of said channels may be selected to fit a number of different needs or configurations.

In addition to providing a range of mounting sites, channels 36–40 also provide a path for air to circulate past cargo loaded up against panel 11. To this end, as shown in the preferred embodiment of FIG. 2, channels 36–38 extend well past the distance necessary to provide the range of mounting sites desired for handles 88 and cleats 89 to provide a vertically-extending flow path for heated and cooled air and for air to circulate responsive to the operation of a ventilating fan. This is of particular convenience when loads are cooled or must be kept frozen.

Construction, assembly and use of the present invention may now be described.

A pair of relatively thin thermoplastic skins 35, 41 each having planar surfaces with a pattern of channels molded thereon, and each having a lowermost portion tapered to a reduced thickness to form a lowermost tapered panel portion 54, and lateral portions 81, 82 tapered to a reduced thickness are placed together in overlapping fashion with channels 36–40 positioned opposite their mirror-image counterparts 36a–40a. Skins 35 and 41 are then attached one to the other, preferably by solvent- or heat-welding front skirt 42 to rear skirt 43 to form a circumferentially-extending bead 44 and defining an air space 45 between skins 35 and 41. A closed-cell foam is the injected through foam ports 46 to fill air space 45, providing structural strength and thermal insulating properties to the panel 11 assembled from skins 35, 41.

Next, a bottom rail 21, preferably formed from a material highly resistant to impact damage is nested or fitted to the tapered, lowermost portion 54 and is attached to skins 35 and 41 by rivets 59. To protect rivets 59, front and rear walls 50, 51 of lower rail 21 have rivet channels 60, 61 which define a recess within which the exposed heads of rivets 59 are positioned. Rivet channel grooves 93, 94 are provided as convenient positioning indicia for the installation of rivets 59. Rivet channels 60, 61 are positioned near the top edges 52, 53 of bottom rail 21 to provide rivets 59 with improved protection form impacts from machinery and the like.

Next, left and right side rails 22 and 23 are assembled to tapered lateral portions 81, 82, with one said side rail having a male configuration and one having a female configuration to allow for lateral interengagement of panels 11. Tapered lateral portion 82 is inserted into side rail 22 (the male configuration) between flanges 64, 75 and secured with rivets 59 positioned along rivet grooves 68, 69 formed within rivet channels 66, 67. Tapered lateral portion 81 is similarly inserted into side rail 23 (the female configuration) and similarly secured with rivets 59 positioned along rivet grooves 79, 80 formed within rivet channels 77, 78. Compressible top bumper 24, preferably made from ballistic nylon filled with flexible polyurethane foam is then attached to the uppermost edge of panel 11.

Use of assembled panels 11 in a conventional truck trailer may now be described. Typically floor 16 of trailer 12 has a series of regularly-spaced grooves 95 extending parallel to one another and extending from front bulkhead 1 to rear doors 18, 19. An assembled panel 11 is installed in trailer 12 by inserting bottom rail track 49 into a selected one of grooves 95 and pivoting panel 21 upward to wedge it into position by compressing top bumper 24 against truck ceiling 13. Next, a second panel 11 is similarly pivoted into position proximate the first panel, taking care to see that one such panel has a male side rail 22 positioned adjacent to the female side rail 23 of the other panel. Next, the panels are brought together laterally to engage base 63 into channel 70, and the process is repeated until a bulkhead of desired length is constructed. When it becomes necessary or desirable for panels 11 to be removed or reconfigured, the foregoing procedure can be carried out in reverse.

Use of highly impact-resistant material such as UHMW-PE adds utility to the present invention by protecting the relatively thin panel skins 35 and 41 from impacts and by providing a stronger material through which to pass and mount rivets.

The number and configuration of channels 36–40 may be altered as desired to provide for a wider variety of mounting sites for handles 88 or cleats 89 or for desired directions of air flow.

For trailers 12 constructed without floor grooves 95, a sunken center channel can be installed and used to engage and mount panels 11.

While the foregoing has presented a description of a preferred embodiment of the present invention, it is to be understood that this description is presented by way of example only and is not intended to limit the scope of the present invention. It is expected that others skilled in the art will perceive variations which, while differing from the foregoing, do not depart from the spirit and scope of the invention as herein described and claimed.

What is claimed is:

1. An insulated bulkhead section, said section comprising:

first and second face panels, each said face panel having an inner planar surface and an outer planar surface;

means formed integrally with each of said face panels to attach two said face panels in face-to-face spaced-apart relationship with said inner planar surfaces facing one another, said attaching means defining upper, lower, left-side and right-side edges, said face panels and said edges defining therebetween a cavity;

means for filling said cavity to create a thermal insulation barrier, said face panels, said edges and said filling means defining a panel insert; and means for supporting said panel insert at said edges, said supporting means including a bottom plate, a top plate, and first and second side rails, said bottom plate, said top plate and said side rails forming a frame extending about the entire periphery of said panel insert, said bottom plate including a pair of spaced-apart walls integrally joined to a lower base, said walls and said base defining a channel within which a lowermost segment of said panel insert is positioned, each said side rail having a pair of spaced-apart flanges integrally joined to a rail base, said flanges and said rial base of said first side rail defining a first rail channel within which a sidemost segment of said panel insert is positioned, said flanges and said rail base of said second side rail defining a second rail channel within which a sidemost segment of said panel insert is positioned, said top plate positioned proximate said upper edge and extending from one said side rail to the other said side rail.

2. The apparatus as recited in claim 1 wherein said bulkhead section includes means for directing a flow of air along said outer planar surfaces.

3. The apparatus as recited in claim 2 wherein said directing means comprises at least one vertically-extending channel formed in one said planar outer surface.

4. The apparatus as recited in claim 1 wherein said first and right second side rails are formed from a rigid thermoplastic material.

5. The apparatus as recited in claim 4 wherein said first and second side rails are formed as thermoplastic extrusions.

6. The apparatus as recited in claim 1 wherein said first side rail includes a first mating section having a first cross-sectional configuration and said second side rail includes a second mating section having a second cross-sectional configuration complementary to said first cross-sectional configuration allowing said first and second mating sections to interengage.

7. The apparatus as recited in claim 1 wherein said bottom plate is formed from a rigid thermoplastic material.

8. The apparatus as recited in claim 7 wherein said bottom plate is formed as a thermoplastic extrusion.

9. The apparatus as recited in claim 1 wherein said top plate includes a section fashioned from a high density compressible thermoplastic foam.

10. The apparatus as recited in claim 1 wherein said face panels are formed from thin, substantially rigid thermoplastic material.

11. The apparatus as recited in claim 10 wherein said face panel attaching means comprise skirts formed at and depending from the periphery of each said face panel.

12. The apparatus as recited in claim 1 wherein said bulkhead section further comprises means formed on said panel insert to position said planar outer surfaces substantially flush with said side rail flanges.

13. The apparatus as recited in claim 1 wherein said bulkhead section further comprises means formed on said panel insert to position said outer face panel surfaces substantially flush with said bottom plate walls.

14. The apparatus as recited in claim 1 wherein said bulkhead section further includes one or more mounting channels formed in at least one said face panel within which handling or mounting hardware may be fastened, each said mounting channel being formed with a depth sufficient to prevent said hardware from protruding above said outer face panel surfaces.

15. The apparatus as recited in claim 14 wherein each said face panel has a pattern of said mounting channels formed therein with said mounting channel patterns being in register one with the other when said face panels are attached together.

16. A repositionable truck trailer bulkhead section for use with trailers of the type having a trailer floor with at least one mounting groove and a trailer ceiling, said bulkhead section comprising:

first and second face panels, each said face panel having an inner planar surface and an outer planar surface;

means formed integrally with each of said face panels to attach two said face panels in face-to-face spaced-apart relationship with said inner planar surfaces facing one another, said attaching means defining upper, lower, left-side and right-side edges, said face panels and said edges defining therebetween a cavity;

means for filling said cavity to create a thermal insulation barrier, said face panels, said edges and said filling means defining a panel insert;

means for supporting said panel insert at said edges, said supporting means including a bottom plate, a top plate, and first and second side rails, said bottom plate, said top plate and said side rails forming a frame extending about the entire periphery of said panel insert, said bottom plate including a pair of spaced-apart walls integrally joined to a lower base, said walls and said base defining a channel within which a lowermost segment of said panel insert is positioned, each said side rail having a pair of spaced-apart flanges integrally joined to a rail base, said flanges and said rail base of said first side rail defining a first rail channel within which a sidemost segment of said panel insert is positioned, said flanges and said rail base of said second side rail defining a second rail channel within which a sidemost segment of said panel insert is positioned, said top plate positioned proximate said upper edge and extending from one said side rail to the other said side rail, said panel insert, said top plate, said bottom plate and said side rails defining said bulkhead section; and means for selectively interengaging one said bulkhead section to others of said bulkhead sections.

17. The apparatus as recited in claim 16 wherein said interengagement means comprises forming said first side rail with a first mating section having a first cross-sectional configuration and forming said second side rail with a second mating section having a second cross-sectional configuration complementary to said first cross-sectional configuration allowing said firs and second mating sections to frictionally interengage.

18. The apparatus as recited in claim 17 wherein said first and second side rails are formed from a rigid thermoplastic material.

19. The apparatus as recited in claim 17 wherein said first and second side rails are formed as thermoplastic extrusions.

20. The apparatus as recited in claim 16 wherein said bottom plate is formed with a rail track along the bottom surface thereof sized and shaped to be inserted into said trailer floor groove.

21. The apparatus as recited in claim 10 wherein said bottom plate is formed from a rigid thermoplastic material.

22. The apparatus as recited in claim 20 wherein said bottom plate is formed as a thermoplastic extrusion.

23. The apparatus as recited in claim 16 wherein said bulkhead section includes means for directing a flow of air along said outer planar surfaces.

24. The apparatus as recited in claim 23 wherein said directing means comprises at least one vertically-extending channel formed in one said planar outer surface.

25. The apparatus as recited in claim 16 wherein said top plate includes a section fashioned from a high density compressible thermoplastic foam.

26. The apparatus as recited in claim 25 wherein said bulkhead is sized and dimensioned to compress said top plate against said trailer ceiling when said bulkhead section is positioned vertically within said trailer.

27. The apparatus as recited in claim 16 wherein said face panels are formed from thin, substantially rigid thermoplastic material.

28. The apparatus as recited in claim 27 wherein said face panel attaching means comprise skirts formed at and depending from the periphery of each said face panel.

29. The apparatus as recited in claim 16 wherein said bulkhead section further comprises means formed on said panel insert to position said outer face panel surfaces substantially flush with said side rail flanges.

30. The apparatus as recited in claim 16 wherein said bulkhead section further comprises means formed on said panel insert to position said outer face panel surfaces substantially flush with said bottom plate walls.

31. The apparatus as recited in claim 16 wherein said bulkhead section further includes one or more channels formed in at least one said face panel within which handling or mounting hardware may be fastened, each said channel being formed with a depth sufficient to prevent said hardware from protruding above said outer face panel surfaces.

32. The apparatus as recited in claim 31 wherein each said face panel has a pattern of said channels formed therein with said channel patterns being in register one with the other when said face panels are attached together.

* * * * *